United States Patent
Smith

(10) Patent No.: US 6,694,859 B2
(45) Date of Patent: Feb. 24, 2004

(54) VARIABLE PRESSURE RELIEF VALVE

(75) Inventor: David P. Smith, Joliet, IL (US)

(73) Assignee: Caterpillar Inc, Peoria, IL (US)

( * ) Notice: Subject to any disclaimer, the term of this patent is extended or adjusted under 35 U.S.C. 154(b) by 30 days.

(21) Appl. No.: 10/109,486

(22) Filed: Mar. 28, 2002

(65) Prior Publication Data

US 2003/0183282 A1 Oct. 2, 2003

(51) Int. Cl.[7] ................ F16K 31/06; F15B 13/044
(52) U.S. Cl. ................ 91/451; 60/468; 137/115.25; 137/596.12; 251/129.08
(58) Field of Search ................ 60/468; 137/115.25, 137/596.12; 251/129.08; 91/451

(56) References Cited

U.S. PATENT DOCUMENTS

| | | |
|---|---|---|
| 4,585,206 A | 4/1986 | Itoh |
| 4,750,704 A | 6/1988 | Brundage |
| 4,848,721 A | 7/1989 | Chudakov |
| 4,941,437 A | 7/1990 | Suzuki et al. |
| 5,137,254 A | 8/1992 | Aardema et al. |
| 5,263,514 A | 11/1993 | Reeves |
| 5,375,623 A | 12/1994 | Weber |
| 5,709,368 A | 1/1998 | Hajek, Jr. |
| 5,791,628 A | 8/1998 | Wolff et al. |
| 5,868,059 A | 2/1999 | Smith |

FOREIGN PATENT DOCUMENTS

| | | |
|---|---|---|
| GB | 2065929 A | 7/1981 |

*Primary Examiner*—Gerald A. Michalsky
(74) *Attorney, Agent, or Firm*—J. W. Burrows; D James Barnes

(57) ABSTRACT

A single stage, electrically controlled variable pressure relief valve assembly is provided that uses a valving element assembly slideably disposed within a housing having first and second inlet and outlet ports, the valving element assembly has a differential area defined thereon which acts in cooperation with an electrically controlled coil assembly to proportionally control the flow of fluid between the inlet port and an outlet ports of the housing. The valving element assembly has inlet and outlet ports that are oriented generally perpendicular to the flow of the fluid through the valving element assembly to effectively offset the effects of flow forces acting on the valving element.

21 Claims, 5 Drawing Sheets

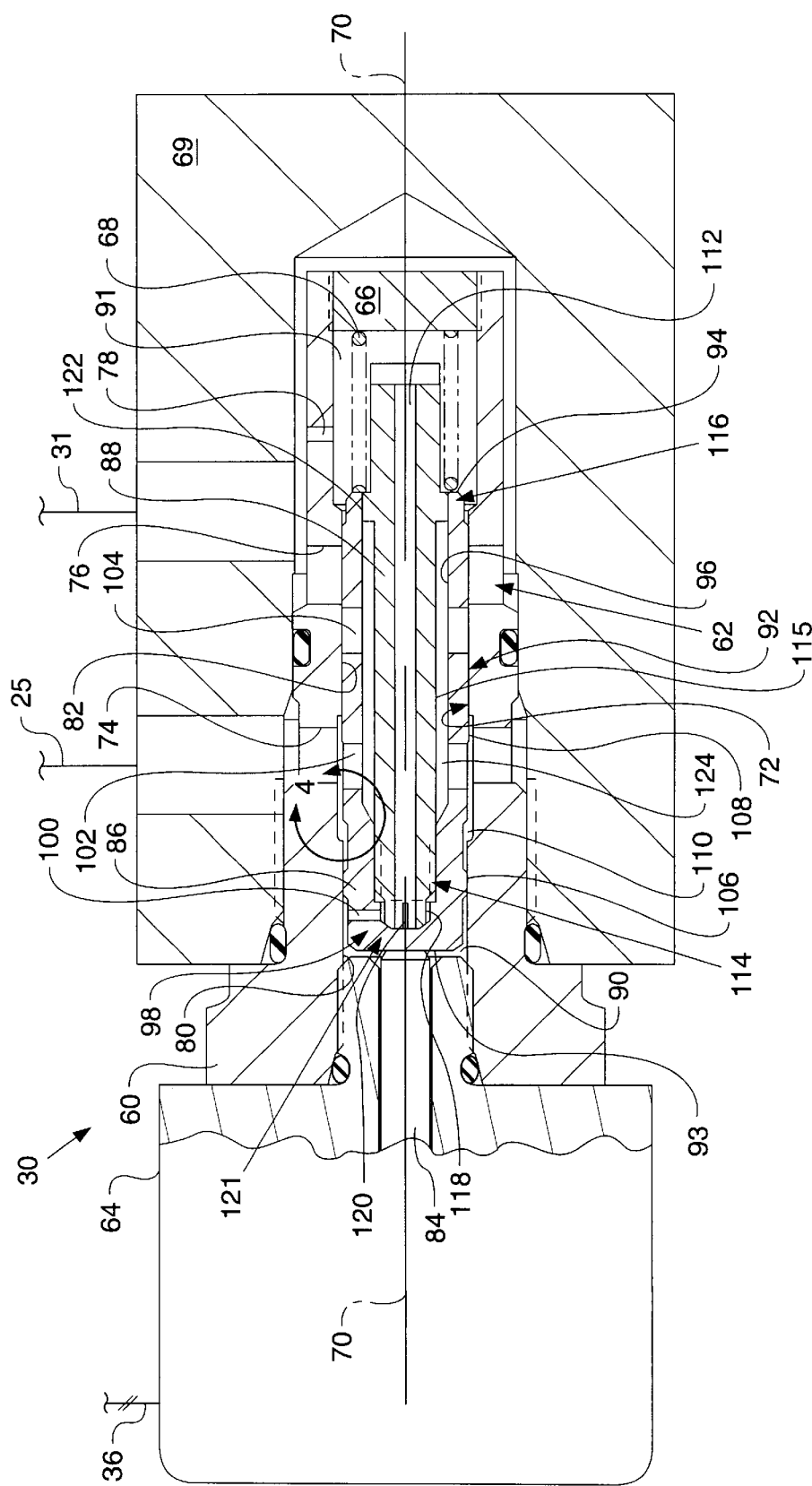

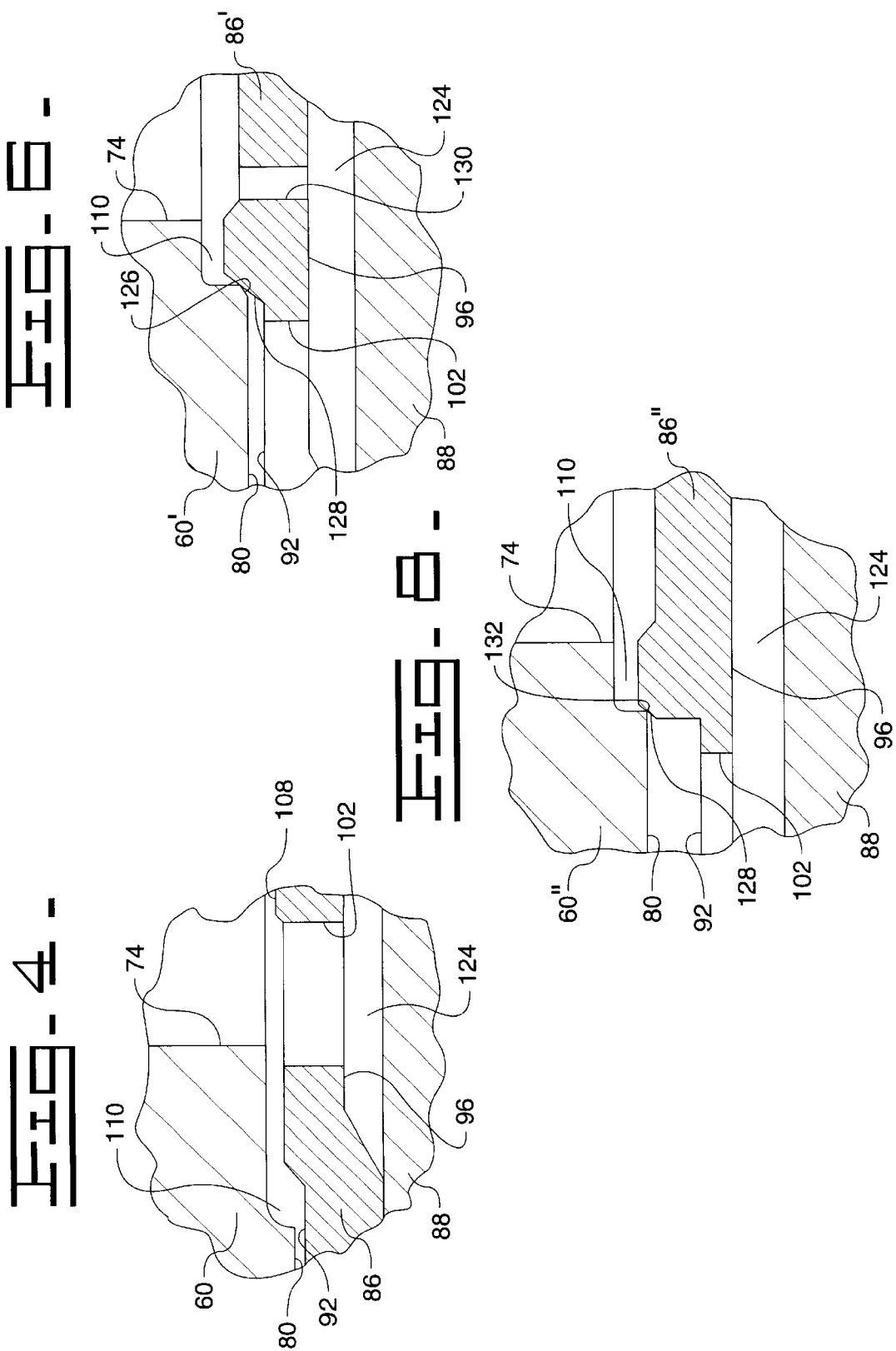

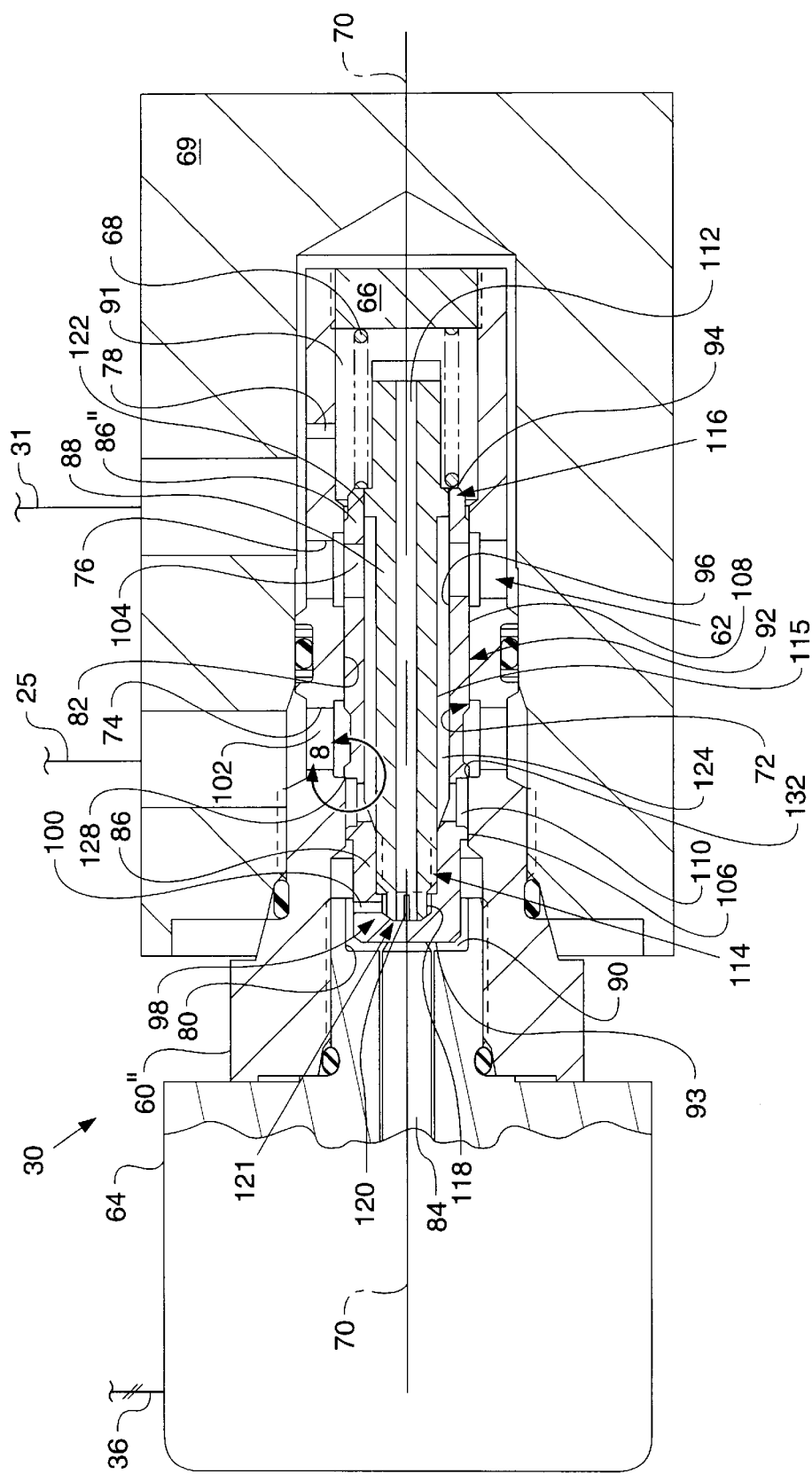

VARIABLE PRESSURE RELIEF VALVE

TECHNICAL FIELD

The present invention relates generally to a variable pressure relief valve and more particularly to a single stage variable pressure relief valve that effectively controls flow forces acting thereon.

BACKGROUND

Variable pressure relief valves are well known. Many of them are two stage types that require a pilot stage valve that controls a main valving element. These types of pressure relief valves typically are larger, more expensive and require small orifices that may become plugged thus effecting the reliability of the pressure relief valve. Many of the known variable pressure relief valves are single stage relief valves that also require small bleed orifices that are subject to plugging and are also affected by flow forces acting to force the valving element open or closed depending on the structure of the valve. Many of the known variable pressure relief valves are electrically controlled in order to adjust the variability in pressure. Typically these electrical coils are large in size and very costly in order to provide the needed forces to offset the counteracting flow forces. One example of a typical two-stage variable pressure relief valve is set forth in U.S. Pat. No. 5,868,059 issued on Feb. 9, 1999 to David P. Smith who is also the inventor of the subject invention.

The subject invention is directed to overcome one or more of the problems set forth above.

SUMMARY OF THE INVENTION

In one aspect of the present invention a single stage, variable pressure relief valve assembly is provided and includes a housing, an electrically controlled coil assembly, a valving element assembly, a spring bumper plug and a spring member. The housing has a reference axis defined therein, a stepped bore defined therethrough along the reference axis, an inlet port, an outlet port and a bleed port in communication with the stepped bore. The stepped bore has a first diameter of a predetermined size and a second diameter of a larger predetermined size to established a differential area therebetween and the inlet and outlet ports open into the larger second diameter. The electrically controlled coil assembly has an armature disposed therein and is sealingly secured to the housing at one end of the stepped bore with the armature of the electrically controlled coil assembly being disposed generally parallel with the reference axis of the housing. The valving element assembly is slideably disposed in the stepped bore of the housing to define a fluid chamber between the valving element assembly and the electrically controlled coil assembly. The valving element assembly includes a sleeve member and a plug member. The sleeve member has first and second ends, a blind bore having a bottom, first and second ports, and a peripheral surface having first and second spaced apart peripheral lands. The first end of the sleeve member is in contact with the armature of the electrically controlled coil assembly. The blind bore in the sleeve member extends from the second end along the reference axis of the housing to the bottom thereof. The first peripheral land is spaced from the first end of the sleeve member and of a size to be slideably received within the first diameter of the housing and the second peripheral land is of a size to be slideably received in the larger second diameter of the housing to form a force control chamber therebetween. The first port of the sleeve member extend from the peripheral surface thereof to the blind bore and the second port thereof extends from the second peripheral land to the blind bore and both of the first and second ports are oriented generally perpendicular to the reference axis of the housing. The plug member has a bore defined therein and has first and second portions. The first portion has a diameter that extends into the blind bore and is sealingly secured to one end of the blind bore. The second portion of the plug member has a diameter larger than the diameter of the first portion thereof and is sealingly disposed in the blind bore of the sleeve member to define a flow control chamber between a portion of the blind bore of the sleeve member and the diameter of the first portion of the plug member. The flow control chamber extends parallel with the reference axis of the housing and is in continuous communication with the first and second ports of the sleeve member. A bleed control orificed passageway is disposed between the fluid chamber and the bore within the plug member. The spring bumper plug is secured in the stepped bore of the housing to form a spring chamber and located at the end thereof opposite to the electrically controlled coil assembly. The spring member is disposed in the valving element assembly between the sleeve member and the bumper plug and operative to urge the valving element assembly towards the electrically controlled coil assembly. The bleed port in the housing communicates with the spring chamber.

BRIEF DESCRIPTION OF THE DRAWINGS

FIG. 3 is a diagrammatic representation of an embodiment of the subject invention;

FIG. 4 is an enlarged view taken from FIG. 3 of a portion '4';

FIG. 6 is an enlarged view taken from FIG. 5 of a portion '6';

FIG. 7 is a diagrammatic representation of yet another embodiment of the subject invention; and FIG. 8 is an enlarged view taken from FIG. 7 of a portion '8'.

DETAILED DESCRIPTION

Figure 1:
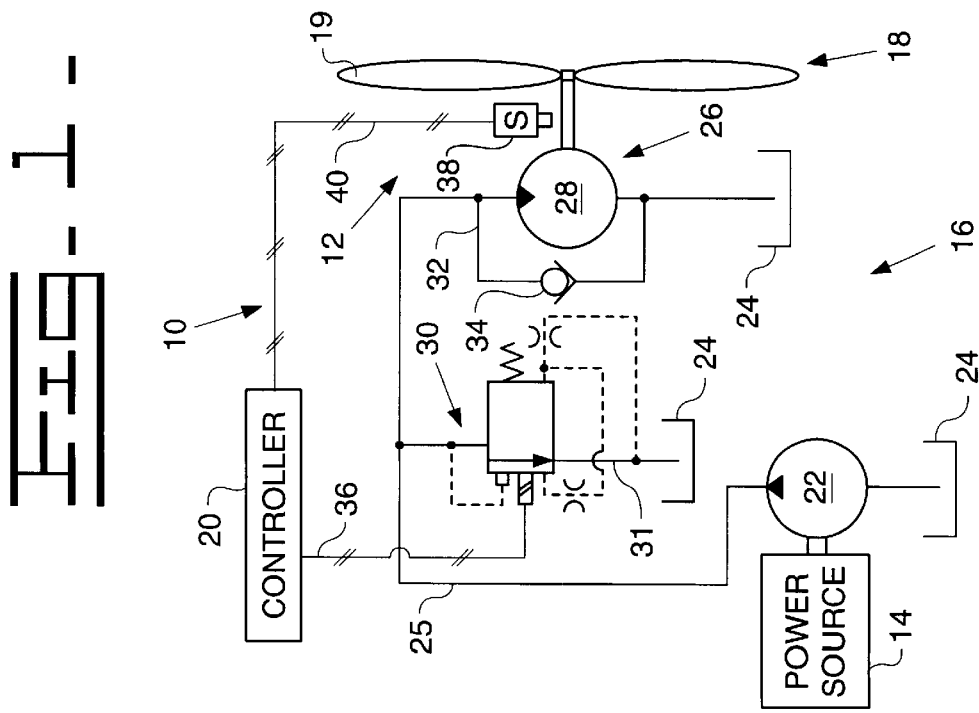
FIG. 1 is a schematic representation of a fluid system incorporating the subject invention.

Referring to FIG. 1, a work system 10 is illustrated for use as a fan drive system 12. The work system 10 includes a power source 14, such as an engine, a fluid system 16 that operatively drives a load 18, such as a cooling fan 19, and a controller 20. The controller 20 could be any known type that responds to an input to control the operation of the work system 10.

The fluid system 16 includes a source of pressurized fluid 22 that receives fluid from a reservoir 24 and delivers the pressurized fluid via a conduit 25 to drive an actuator 26, such as a fluid motor 28 that is connected to the cooling fan 19. The fluid system 16 also includes a single stage, electrically controlled variable pressure relief valve assembly 30, hereinafter described and referred to as 'the relief valve', that is operatively connected to the conduit 25 and connected to the reservoir 24 via a conduit 31. A fluid make-up conduit 32 is connected between the conduit 25 upstream of the fluid motor 28 and the reservoir 24 and has a one-way check valve 34 disposed therein and operative to block flow from the conduit 25 to the reservoir 24 and permit flow from the reservoir 24 to the conduit 25.

The relief valve 30 is operatively connected to the controller 20 by an electrical line 36. A speed sensor 38 is connected to the controller 20 by an electrical line 40 and disposed between the fluid motor 28 and the cooling fan 19. The speed sensor 38 is operative to sense the speed of the cooling fan and deliver a signal representative thereof to the controller 20 via the electrical line 40. It is recognized that the speed sensor 38 could be eliminated and/or a pressure sensor could be added to conduit 25 without departing from the essence of the subject invention.

Figure 2:
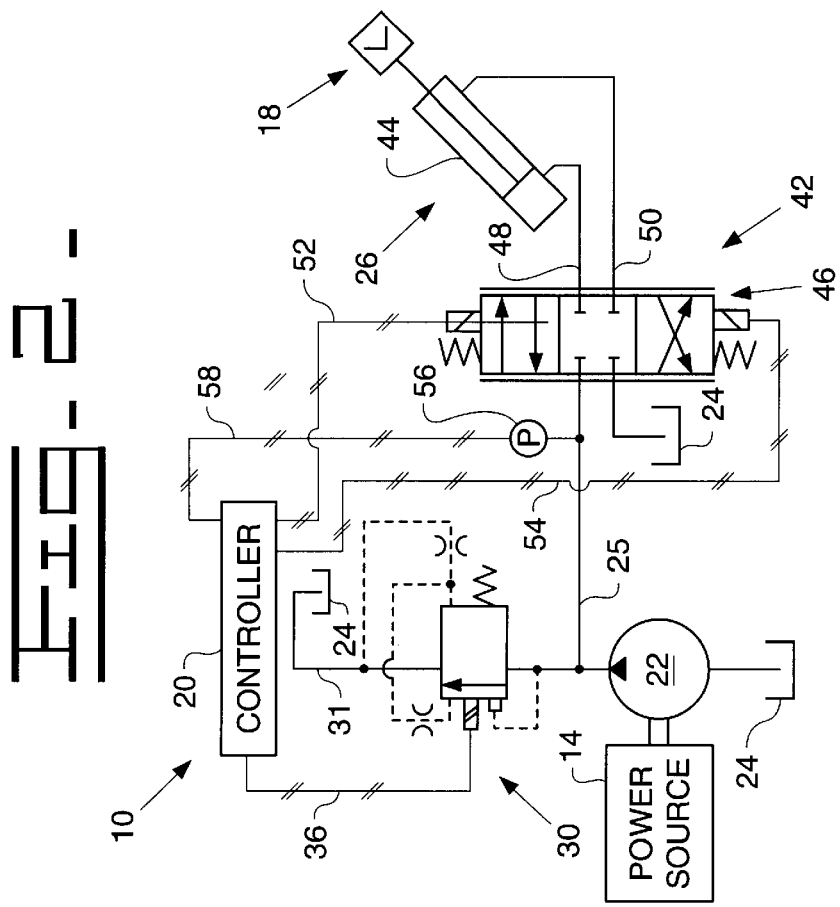
FIG. 2 is a schematic representation of another fluid system incorporating the subject invention.

Referring to FIG. 2, another work system 10 is illustrated. Like elements have like element numbers. The work system 10 of FIG. 2 is illustrated as an implement system 42 and the actuator 26 is a fluid cylinder 44 connected to the load 18. The load 18 could be any known load such as a machine bucket and mechanism, a machine boom and mechanism, machine backhoe and mechanisms, etc. Likewise, the actuator 26 could be a fluid motor drivingly connected to a machine cab rotating mechanism and the like.

The fluid system 16 of FIG. 2 includes a directional control valve 46 connected to the fluid conduit 25 and operative in a known manner to control the flow of pressurized fluid to and from the fluid cylinder 44 via conduits 48,50. The directional control valve 46 is controllably connected to the controller 20 via electrical lines 50,52. The relief valve 30 is operatively connected between the conduit 25 and the reservoir 24 and to the controller 20 like that of FIG. 1.

A pressure sensor 56 is connected to the conduit 25 and an electrical line 58 connects the pressure sensor to the controller 20. The pressure sensor 56 is operative to sense the pressure in the conduit 25 and deliver a signal representative thereof to the controller 20.

Referring to FIGS. 3 and 4, an embodiment of the relief valve 30 is illustrated in more detail. The relief valve 30 includes a housing 60, a valving element assembly 62, an electrically controlled coil assembly 64, a spring bumper plug 66, and a spring member 68. In the subject arrangement, the relief valve 30 is a cartridge assembly and is disposed in a block arrangement 69. It is recognized that the relief valve 30 could be disposed in various arrangements without departing from the essence of the invention.

The housing 60 has a reference axis 70 defined therein and has a stepped bore 72 defined therethrough along the reference axis 70. An inlet port 74, an outlet port 76, and a bleed port 78 each communicating with the stepped bore 72 thereof. The inlet and outlet ports 74,76 are oriented generally perpendicular to the reference axis 70 of the housing. It is recognized that the inlet and outlet ports 74,76 could be oriented at some other angle without departing from the essence of the subject invention. The stepped bore 72 has a first diameter 80 of a predetermined size and a larger, second diameter 82 of a predetermined size. The inlet port 74 opens into the stepped bore 72 at a location between the first and second diameters 80,82 thereof and the outlet port 76 opens into the second diameter 82 thereof. A differential area is established within the stepped bore 72 by the difference in size between the first and second diameters 80,82.

The electrically controlled coil assembly 64 is secured to the housing 60 at the end of the stepped bore 72 thereof generally adjacent to the first diameter 80. The electrically controlled coil assembly 64 has an armature 84 disposed therein that lies generally parallel to the axis 70 of the housing 60. In a well known manner, the electrically controlled coil assembly 64 has an electrical coil (not shown) disposed about at least a portion of the armature 84 and is operative in response to receipt of an electrical signal through the electrical line 36 to urge the armature 84 in a direction towards the stepped bore 72.

The valving element assembly 62 is slideably disposed in the stepped bore 72 of the housing 60 and includes a sleeve member 86 and a plug member 88. A fluid chamber 90 is defined in the stepped bore 72 between the armature 84 of the electrically controlled coil assembly 64 and the valving element assembly 62. A spring chamber 91 is formed in the stepped bore 72 of the housing 60 at the end thereof opposite to the electrically controlled coil assembly 94 between the valving element assembly 62 and the spring bumper plug 66. The spring member 68 is operative to urge the valving element assembly 62 towards the armature 84 of the electrically controlled coil assembly 64.

The sleeve member 86 of the valving element assembly 62 has a peripheral surface 92 and first and second ends 93,94. A blind bore 96 having a bottom 98, a bleed passage 100, and first and second ports 102,104 are defined in the sleeve member 86. The first and second ports 102,104 are oriented generally perpendicular with the reference axis 70 of the housing 60. In the subject arrangement, the blind bore 96 is a stepped blind bore (hereafter referred to as the blind bore) and the bleed passage 100 is disposed between the peripheral surface 92 thereof and the bottom 98 of the blind bore 96. The blind bore 96 extends from the second end of the sleeve member 86 to the bottom 98 thereof.

The peripheral surface 92 of the sleeve member 86 includes a first peripheral land 106 disposed thereabout spaced from the first end 93 thereof and of a size sufficient to be slideably received within the first diameter 80 of the stepped bore 72 of the housing 60. The peripheral surface 92 also includes a larger, second peripheral land 108 disposed thereabout and is of a size sufficient to be slideably received within the larger, second diameter 82 of the housing 60. The first port 102 of the sleeve member 86 extends from a location between the first and second peripheral lands 106, 108 into the blind bore 96 and the second port 104 extends from the larger, second peripheral land 108 into the blind bore 96. In the subject embodiment, the first port 102 of the sleeve member 86 is in continuous communication with the inlet port 74 of the housing 60 and the second port 104 of the sleeve member 86 is in selective communication with the outlet port 76 of the housing 60.

The difference in area between the first peripheral land 106 on the sleeve member 86 and the larger, second peripheral land 108 on the sleeve member 86 establishes a differential area identical in size to the differential area established within the stepped bore 72 of the housing 60. A force control chamber 110 is defined by the respective differential areas that were established by the stepped bore 72 of the housing 86 and the peripheral surface 92 of the sleeve member 86. The force control chamber 110 is in continuous communication with the inlet port 74 of the housing 60. The force control chamber 110 and the respective differential areas are more clearly illustrated in the enlarged view of FIG. 4.

The plug member 88 has a bore 112 defined therein disposed along the reference axis 70 of the housing 60 and includes first and second portions 114,116. The first portion 114 has a small diameter 115 of a size smaller than the diameter of the blind bore 96 and extends into the blind bore 96 to a location generally adjacent the bottom 98 thereof to form a bleed control chamber 118. A bleed orifice 120 is defined between the bleed control chamber 118 and the bore 112 of the plug member 88. The bleed passage 100 in the sleeve member 86, the bleed control chamber 118, and the bleed orifice 120 collectively make up a bleed control orificed passageway 121.

The second portion 116 of the plug member 88 has a larger diameter 122 of a size sufficient to be sealingly disposed in the blind bore 96 of the sleeve member 86 at a location generally adjacent the second end 94 thereof. A flow control chamber 124 is defined in the valving element assembly 62 between the blind bore 96 in the sleeve member 86 and the small diameter 115 of the plug member 88. The flow control chamber 124 is in continuous communication with each of the first and second ports 102,104 of the sleeve member 86 and extends parallel with the reference axis 70 of the housing 60.

Figure 5:
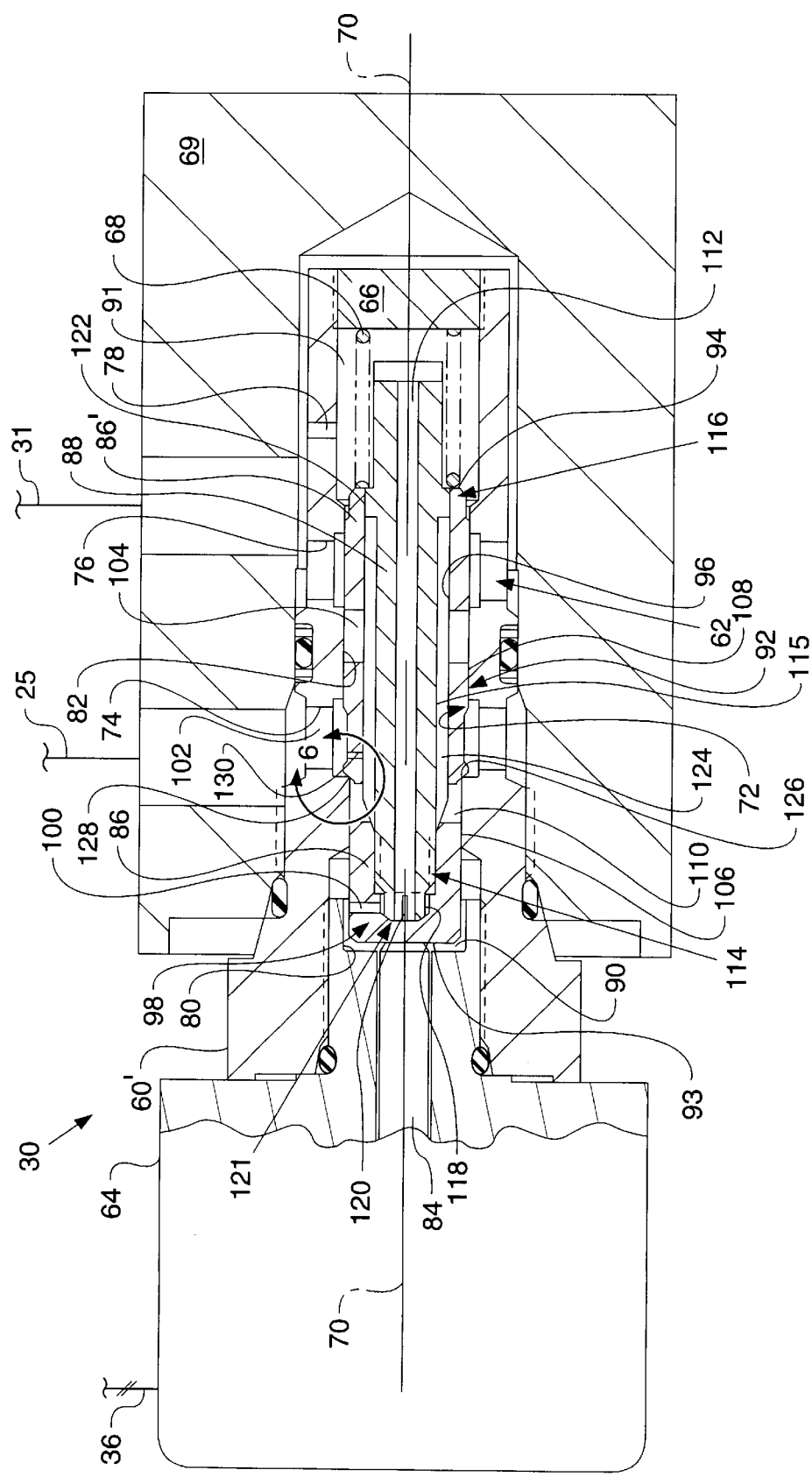
FIG. 5 is a diagrammatic representation of another embodiment of the subject invention.

Referring to FIGS. 5 and 6, another embodiment of the subject invention is illustrated. Like elements have like element numbers. Elements from FIGS. 3 and 4 that are modified and used in FIGS. 5 and 6 are represented in FIGS. 5 and 6 by a 'prime' being attached to the element number used in FIGS. 3 and 4.

The housing 60' of FIGS. 5 and 6 has a surface 126 formed therein between the first diameter and the larger, second diameter of the stepped bore 72'. The surface 126 forms an acute angle of a predetermined size with respect to the reference axis 70 thereof. All other aspects of the housing 60' are the same as those set forth with respect to the housing 60 of FIG. 3.

The sleeve member 86' of the valving element assembly 62' of FIGS. 5 and 6 has a surface 128 formed on the peripheral surface 92 thereof between the first peripheral land 106 and the larger, second peripheral land 108. The surface 128 forms an acute angle with respect to the reference axis 70 of the housing 60' that is greater than the acute angle of the surface 126 formed within the stepped bore 72' of the housing 60'. It is recognized that the respective acute angles of the surfaces 126,128 could be the same without departing from the essence of the subject invention.

The first port 102 of the sleeve member 86' is disposed between the first peripheral land 106 and the surface 128 thereof. A control orifice 130 is defined in the sleeve member 86' between the second peripheral land 108 and the blind bore 96 thereof and is located generally adjacent to the surface 128 and in continuous communication with the inlet port 74 of the housing 60'. It is recognized that in some applications the control orifice 130 may be eliminated. In the subject embodiment, the inlet port 74 of the housing 60' remains in continuous communication with the force control chamber 110 through the control orifice 130 and/or through leakage that may occur across the interface between the angled surfaces 126,128. The second port 104 of the sleeve member 86' is in selective communication with the outlet port 76 of the housing 60' just like that of FIG. 3. All other aspects of the valving element assembly 62' of FIGS. 5 and 6 are the same as the valving element assembly 62 of FIGS. 3 and 4.

Referring to FIGS. 7 and 8, another embodiment of the subject invention is illustrated. Like elements have like element numbers. Elements from FIGS. 5 and 6 that are modified and used in FIGS. 7 and 8 are represented in FIGS. 7 and 8 by a 'double prime' being attached to the element number used in FIGS. 3 and 4.

The housing 60" of FIGS. 7 and 8 has a shoulder 132 formed between the first diameter 80 of the stepped bore 72 and the larger, second diameter 82 thereof. The shoulder 132 establishes the differential area between the first and second diameters 80,82 of the stepped bore 72. Even though the shoulder 132 is illustrated as a sharp corner, it is recognized that the shoulder 132 could be formed at an angle like that of FIGS. 5 and 6. All other aspects of the housing 60" are the same as those of the housing 60 described with respect to FIG. 3.

The sleeve member 86" of the valving element assembly 62" has the surface 128 formed thereon like that of FIGS. 5 and 6 and the surface 128 is operative to engage the shoulder 132. The established differential area and the force control chamber 110 are both in continuous communication with the inlet port 74 of the housing 60". The first port 102 of the sleeve member 86" is located between the first peripheral land 106 and the angled surface 128 and in selective communication with the inlet port 74 of the housing 60". The second port 104 of the sleeve member 86" is in continuous communication with the outlet port 76 of the housing 60". All other aspects of the valving element assembly 62" are the same as those described with respect to the valving element assembly 62 of FIGS. 3 and 4.

It is recognized that various aspects of the subject embodiments of the relief valve 30 and their use in various work systems 10 could be modified without departing from the essence of the subject invention.

Industrial Applicability

Referring to the operation of the fan drive work system 10 of FIG. 1, the source of pressurized fluid 22 delivers pressurized fluid via the conduit 25 to the fluid motor 28 in a conventional manner to turn the cooling fan 19. The speed of the cooling fan 19 is dependent on the volume and pressure of the fluid being delivered to the fluid motor 28. Since movement of the cooling fan 19 creates resistance, the fluid being delivered to the fluid motor 28 must be pressurized to overcome the resistance. Likewise, additional speed of the cooling fan 19 requires additional pressure be applied to the fluid being delivered to the fluid motor 28 in order to increase the fan speed. In order to control the level of the pressure of the fluid in the conduit 25, the pressure of the fluid in the conduit 25 is directed to the relief valve 30 and the relief valve 30 functions in a known manner to limit the maximum pressure of the fluid in the conduit 25.

The controller 20 monitors the speed of the cooling fan 19 and is operative through the relief valve 30 to control the speed of the cooling fan 19 by varying the pressure level of the fluid being delivered to the fluid motor 28. Once the pressure level of the fluid in the conduit 25 reaches the level as defined by the controller 20, a controlled amount of fluid from the conduit 25 is bypassed across the relief valve 30 to the reservoir 24. The volume of fluid being bypassed across the relief valve 30 is controlled in order to maintain the desired pressure level of the fluid in the conduit 25. The pressure setting within the relief valve 30 is varied in response to the controller 20 directing an electrical signal to the relief valve 30 through the electrical line 36. The operation of the relief valve 30 will be more fully described below.

Referring to the operation of the implement work system 10 of FIG. 2, the source of pressurized fluid 22 delivers pressurized fluid via a conduit 25 through the directional control valve 46 to the fluid cylinder 44 to move the load 18 in a conventional manner. In the subject embodiment, the controller operates in response to a remote input to control movement of the directional control valve 46 between its operative positions. The pressure of the fluid in the conduit 25 is sensed by the controller 20 and the level of pressure therein is controlled by the relief valve 30 in response to receipt of an electrical signal from the controller 20 through the electrical line 36. The pressure within the implement work system 10 is controlled by varying the setting of the relief valve 30.

Referring to the operation of the relief valve 30 of the embodiment of FIGS. 3 and 4, pressurized fluid in the conduit 25 is directed to the inlet port 74, through the force control chamber 110, through the first port 102 of the sleeve member 86, through the flow control chamber 124, and into the second port 104 of the sleeve member 86. Since the spring member 68 is urging the valving element assembly 62 towards the electrically controlled coil assembly 64, the second port 104 of the sleeve member 86 is blocked from the outlet port 76 of the housing 60 and thus blocked from the conduit 31 leading to the reservoir 24. The pressure of the fluid in the force control chamber 110 acts on the differential area sleeve member 86 and creates a force acting against the force of the spring member 68. Once the pressure of the fluid within the force control chamber 110 reaches a level sufficiently high to create a force large enough to overcome the force of the spring member 68, the valving element assembly 62 moves in a direction against the spring member 68 to controllably interconnect the second port 104 with the outlet port 76 of the housing 60. Metering the fluid out from the second port 104 to the outlet port 76 establishes the maximum pressure level of the relief valve 30. Flow forces acting on the valving element assembly 62 are substantially eliminated by directing the flow of fluid into the flow control chamber 124 from a direction perpendicular to the flow control chamber 124, changing the direction of the flow of fluid to be parallel to the reference axis 70 along the flow control chamber 124, then directing the flow of fluid out from the flow control chamber 124 in a perpendicular direction through the second port 104. Since the flow control chamber 124 is fully contained within the valving element assembly 62, the flow forces acting on the valving element assembly 62 is effectively nullified.

By keeping the differential area within the force control chamber 110 small, the size and force of the spring member 68 is kept small thus eliminated bulky sizes of components. Likewise, the electrically controlled coil assembly 64 is kept small and compact since it does not need to provide extremely large forces.

In order to vary the pressure setting of the relief valve 30, the controller 20 directs a predetermined electrical signal through the electrical line 36 to the electrically controlled coil assembly 64 to move the armature 84 in a direction against the valving element assembly 62 in proportion to the magnitude of the electrical signal. Since the force of the armature 84 acting on the valving element assembly 62 is additive to the force being created by the pressure of the fluid within the force control chamber 110, the pressure setting of the relief valve 30 is reduced in proportion to the electrical signal from the controller 20. Consequently, the setting of the relief valve 30 may be selectively varied between a maximum value and a minimum value dependent on the magnitude of the electrical signal from the controller 20.

Movement of the valving element assembly 62 towards the electrically controlled coil assembly 64 is damped by the flow of fluid from the fluid chamber 90 being directed through the bleed control orificed passageway 121 to the bore 112 in the plug member 88 and into the spring chamber 91. Fluid within the spring chamber 91 is vented to the reservoir 24 through the bleed port 78 of the housing 60 and the outlet port 76.

The operation of the relief valve 30 of the embodiment set forth in FIGS. 5 and 6 is very similar to that of FIGS. 3 and 4. However, in the embodiment of FIGS. 5 and 6, the first port 102 of the sleeve member 86' is separated from the inlet port 74 of the housing 60' by the interface between the angled surface 126 on the housing 60' and the angled surface 128 on the sleeve member 86'. The pressurized fluid at the inlet port 74 of the housing 60' communicates with the first port 102 of the sleeve member 86' and the flow control chamber 124 through the control orifice 130 and/or leakage across the interface between the angled surfaces 126,128. Pressurized fluid in the flow control chamber 124 communicates with the second port 104 of the sleeve member 86' but is selectively blocked from the outlet port 76 of the housing 60'. Pressurized fluid within the force control chamber 110 acts on the differential area of the valving element assembly 62' urging it against the bias of the spring member 68. Once the force resulting from the pressure of the fluid within the force control chamber 110 overcomes the force of the spring member 68, the valving element assembly 62' moves against the spring member 68 to controllably meter the fluid within the flow control chamber 124 out to the outlet port 76.

The flow forces acting on the valving element assembly 62' of the embodiment of FIGS. 5 and 6 are controlled in the same manner as that described with respect to the valving element assembly 62 of FIGS. 3 and 4. Likewise, the pressure relief setting of the relief valve 30 is changed like that described with respect to the relief valve 30 of FIGS. 3 and 4.

The operation of the relief valve 30 of the embodiment set forth in FIGS. 7 and 8 is very similar to that set forth in the previous embodiments of FIGS. 3–6. However, the embodiment of FIGS. 7 and 8 meters the flow of fluid into the valving element assembly 62" as opposed to metering the flow of fluid out of the valving element assembly 62". In the housing 60", the shoulder 132 formed thereon interfaces with the angled surface 128 on the sleeve member 86" to selectively block the communication between the inlet port 74 of the housing 60" and the first port 102 of the sleeve member 86". Further, the second port 104 of the sleeve member 86" is in continuous communication with the outlet port 76 of the housing 60". The pressure of the fluid within the force control chamber 110 acting on the differential area of the valving element assembly 62" urges the valving element assembly 62" against the bias of the spring member 68. Once the force created by the pressure of the fluid within the force control chamber 110 overcomes the bias of the spring member 68, the valving element assembly 62" moves against the bias of the spring member 68 to controllably meter fluid from the inlet port 74 through the first port 102 of the sleeve member 86" to the flow control chamber 124. The fluid in the flow control chamber 124 freely exits through the second port 104 of the sleeve member 86" and the outlet port 76 of the housing 60".

The flow forces acting on the valving element assembly 62" of the embodiment of FIGS. 7 and 8 are controlled in the same manner as that described with respect to the valving element assembly 62 of FIGS. 3 and 4. Likewise, the pressure relief setting of the relief valve 30 is changed like that described with respect to the relief valve 30 of FIGS. 3 and 4.

From the foregoing, it is readily apparent that the subject relief valve 30 is compact in size and not adversely affected by flow forces acting on the valving element assembly 62 therein. Consequently, the internal pressure setting of the relief valve 30 is precisely controllable and makes it very practical to use in various work systems 10, such as, for example fan drive systems and implement systems.

Other aspects, objects and advantages of this invention can be obtained from a study of the drawings, the disclosure and the appended claims.

What is claimed is:

1. A single stage, electrically controlled variable pressure relief valve assembly, comprising:

a housing having a reference axis defined therein, a stepped bore defined therethrough along the reference axis, an inlet port, an outlet port and a bleed port in communication with the stepped bore, the stepped bore has a first diameter of a predetermined size and a second diameter of a larger predetermined size to established a differential area therebetween and the inlet and outlet ports open into the larger second diameter;

an electrically controlled coil assembly having an armature disposed therein and being sealingly secured to the housing at one end of the stepped bore with the armature of the electrically controlled coil assembly being disposed generally parallel with the reference axis of the housing;

a valving element assembly slideably disposed in the stepped bore of the housing to define a fluid chamber between the valving element assembly and the armature of the electrically controlled coil assembly, the valving element assembly includes a sleeve member and a plug member, the sleeve member has first and second ends, a blind bore having a bottom, first and second ports, and a peripheral surface having first and second spaced apart peripheral lands, the first end of the sleeve member is in contact with the armature of the electrically controlled coil assembly and the blind bore in the sleeve member extends from the second end along the reference axis of the housing to the bottom thereof, the first peripheral land is spaced from the first end of the sleeve member and of a size to be slideably received within the first diameter of the housing and the second peripheral land is of a size to be slideably received in the larger second diameter of the housing to form a force control chamber therebetween, the first port of the sleeve member extends from the peripheral surface thereof to the blind bore and the second port thereof extends from the second peripheral land to the blind bore and both of the first and second ports are oriented generally perpendicular to the reference axis of the housing, the plug member has a bore defined therein and has first and second portions, the first portion has a diameter that extends into the blind bore and is sealingly secured to one end of the blind bore, the second portion of the plug member has a diameter larger than the diameter of the first portion thereof and is sealingly disposed in the blind bore of the sleeve member to define a flow control chamber between a portion of the blind bore of the sleeve member and the diameter of the first portion of the plug member, the flow control chamber extends parallel with the reference axis of the housing and is in continuous communication with the first and second ports of the sleeve member, a bleed control orificed passageway is disposed between the fluid chamber located between the valving element assembly and the armature and the bore within the plug member;

a spring bumper plug secured in the stepped bore of the housing to form a spring chamber and located at the end thereof opposite to the electrically controlled coil assembly; and a spring member disposed in the valving element assembly between the sleeve member and the bumper plug and operative to urge the valving element assembly towards the electrically controlled coil assembly, the bleed port in the housing communicates with the spring chamber.

2. The single stage, electrically controlled variable pressure relief valve assembly of claim 1 wherein the difference in size of the first and second peripheral lands on the sleeve member in the force control chamber establishes a differential area thereon that is in continuous communication with the inlet port of the housing.

3. The single stage, electrically controlled variable pressure relief valve assembly of claim 2 wherein the second port of the sleeve member is in selective communication with the outlet port of the housing to meter flow out of the valving element assembly.

4. The single stage, electrically controlled variable pressure relief valve assembly of claim 3 wherein the first port of the sleeve member is in continuous communication with the inlet port of the housing.

5. The single stage, electrically controlled variable pressure relief valve assembly of claim 3 wherein the first port of the sleeve member is in selective communication with the inlet port of the housing.

6. The single stage, electrically controlled variable pressure relief valve assembly of claim 3 wherein the inlet and outlet ports of the housing are oriented generally perpendicular to the reference axis of the housing.

7. The single stage, electrically controlled variable pressure relief valve assembly of claim 2 wherein the differential area on the sleeve member of the valving element assembly is formed by a surface that forms an acute angle with respect to the reference angle of the housing.

8. The single stage, electrically controlled variable pressure relief valve assembly of claim 7 wherein the differential area on the stepped bore of the housing is formed by a surface that forms an acute angle with respect to the reference angle of the housing.

9. The single stage, electrically controlled variable pressure relief valve assembly of claim 8 wherein the acute angle of the differential area surface on the sleeve member is larger than the acute angle of the differential area surface on stepped bore of the housing.

10. The single stage, electrically controlled variable pressure relief valve assembly of claim 2 wherein the second port of the sleeve member is in continuous communication with the outlet port of the housing and the first port of the sleeve member is in selective communication with the inlet port of the housing to meter flow into the valving element assembly.

11. The single stage, electrically controlled variable pressure relief valve assembly of claim 2 wherein the bleed control orificed passageway is formed by a bleed passage defined in the sleeve member adjacent the bottom of the blind bore, a bleed control chamber defined at the bottom of the blind bore, and a bleed orifice defined in the first diameter of the plug member.

12. The single stage, electrically controlled variable pressure relief valve assembly of claim 2 in combination with a fluid system to form a work system, the fluid system having a reservoir connected to the outlet port of the housing, a source of pressurized fluid connected to the inlet port of the housing, a fluid actuator operatively connected to source of pressurized fluid to move a load and a controller operatively connected to the electrically controlled coil assembly.

13. The single stage, electrically controlled variable pressure relief valve assembly of claim 12 wherein the work system is a fan drive system and the fluid actuator is a fluid motor and the load is a cooling fan.

14. The single stage, electrically controlled variable pressure relief valve assembly of claim 12 wherein the work system is an implement system and the fluid system includes a directional control valve operative to control the flow of the fluid from the source of pressurized fluid to the fluid actuator.

15. The single stage, electrically controlled variable pressure relief valve assembly of claim 12 wherein one of a pressure sensor and a speed sensor is operatively disposed within the work system.

16. A single stage, electrically controlled variable pressure relief valve assembly comprising:
- a housing having a reference axis defined therein, a stepped bore defined therethrough along the reference axis, an inlet port, an outlet port and a bleed port in communication with the stepped bore;
- an electrically controlled coil assembly having an armature disposed therein and being sealingly secured to the housing at one end of the stepped bore with the armature of the electrically controlled coil assembly being disposed generally parallel with the reference axis of the housing;
- a valving element assembly slideably disposed in the stepped bore of the housing and the electrically controlled coil assembly, the valving element assembly includes a sleeve member and a plug member, the sleeve member defines a blind bore and has first and second ends, first and second ports oriented generally perpendicular with the reference axis of the housing, and a peripheral surface having first and second spaced apart peripheral lands, the first end of the sleeve member is in contact with the armature of the electrically controlled coil assembly, the first peripheral land is spaced from the first end of the sleeve member and of a size to be slideably received within the stepped bore in the housing and the second peripheral land is larger than the first peripheral land and of a size to be slideably received in the stepped bore in the housing to form a force control chamber therebetween, the first port of the sleeve member extends from the peripheral surface thereof to the blind bore and the second port thereof extends from the second peripheral land to the blind bore, the plug member has first and second portions, the first portion has a diameter that extends into the blind bore and is sealingly secured to one end of the blind bore, the second portion of the plug member has a diameter larger than the diameter of the first portion thereof and is sealingly disposed in the blind bore of the sleeve member to define a flow control chamber between a portion of the blind bore of the sleeve member and the diameter of the first portion of the plug member, the flow control chamber extends parallel with the reference axis of the housing and is in continuous communication with the first and second ports of the sleeve member, the flow control chamber in cooperation with the first and second ports in the sleeve member create a flow path through the valving element assembly;
- a spring bumper plug secured in the stepped bore of the housing to form a spring chamber and located at the end thereof opposite to the electrically controlled coil assembly; and
- a spring member disposed in the valving element assembly between the sleeve member and the bumper plug and operative to urge the valving element assembly towards the electrically controlled coil assembly, the bleed port in the housing communicates with the spring chamber.

17. The single stage, electrically controlled variable pressure relief valve assembly of claim 16 wherein the difference in size of the first and second peripheral lands on the sleeve member in the force control chamber establishes a differential area thereon that is in continuous communication with the inlet port of the housing.

18. The single stage, electrically controlled variable pressure relief valve assembly of claim 17 wherein the second port of the sleeve member is in selective communication with the outlet port of the housing to meter flow out of the valving element assembly.

19. The single stage, electrically controlled variable pressure relief valve assembly of claim 18 wherein the first port of the sleeve member is in continuous communication with the inlet port of the housing.

20. The single stage, electrically controlled variable pressure relief valve assembly of claim 18 wherein the first port of the sleeve member is in selective communication with the inlet port of the housing.

21. The single stage, electrically controlled variable pressure relief valve assembly of claim 18 wherein the inlet and outlet ports of the housing are oriented generally perpendicular to the reference axis of the housing.

* * * * *